(12) United States Patent
Pfeifer

(10) Patent No.: US 8,732,655 B2
(45) Date of Patent: May 20, 2014

(54) SYSTEMS AND METHODS FOR METAMODEL TRANSFORMATION

(75) Inventor: Wolfgang Pfeifer, Kerzenheim (DE)

(73) Assignee: SAP AG, Walldorf (DE)

( * ) Notice: Subject to any disclaimer, the term of this patent is extended or adjusted under 35 U.S.C. 154(b) by 210 days.

(21) Appl. No.: 13/339,618

(22) Filed: Dec. 29, 2011

(65) Prior Publication Data

US 2013/0174116 A1    Jul. 4, 2013

(51) Int. Cl.
*G06F 7/00* (2006.01)
*G06F 17/30* (2006.01)
*G06F 3/00* (2006.01)
*G06F 9/44* (2006.01)
*G06F 9/45* (2006.01)

(52) U.S. Cl.
USPC ........... 717/104; 707/797; 715/762; 717/100; 717/105; 717/114; 717/122; 717/156

(58) Field of Classification Search
None
See application file for complete search history.

(56) References Cited

U.S. PATENT DOCUMENTS

| | | | |
|---|---|---|---|
| 6,292,932 B1 * | 9/2001 | Baisley et al. | 717/114 |
| 6,684,386 B1 * | 1/2004 | Baisley | 717/114 |
| 7,761,493 B1 * | 7/2010 | Markel et al. | 707/797 |
| 7,941,438 B2 * | 5/2011 | Molina-Moreno et al. | 717/105 |
| 2004/0015814 A1 * | 1/2004 | Trappen et al. | 717/100 |
| 2004/0153992 A1 * | 8/2004 | Molina-Moreno et al. | 717/105 |
| 2006/0150169 A1 * | 7/2006 | Cook et al. | 717/156 |
| 2009/0125128 A1 * | 5/2009 | Eldridge et al. | 717/122 |
| 2010/0223593 A1 * | 9/2010 | Eldridge et al. | 717/105 |
| 2012/0179987 A1 * | 7/2012 | Mohan et al. | 715/762 |

OTHER PUBLICATIONS

Frederic Jouault et al. KM3: A DSL for Metamodel Specification, 2006, [Retrieved on Apr. 1, 2013]. Retrieved from the internet: <URL: http://link.springer.com/content/pdf/10.1007%2F11768869__14> 15 pages (171-185).*
Jean Marie Lions et al., Extending OpenTool/UML Using Metamodeling: An Aspect Oriented Programming Case Study, 2002, [Retrieved on Apr. 1, 2013]. Retrieved from the internet: <URL: http://citeseerx.ist.psu.edu/viewdoc/summary?doi=10.1.1.1.138.7466> 7 Pages (1-7).*
Waleed A. Muhanna et al., Meta-Modeling Concepts and Tools for Model Management: A Systems Approach, Sep. 1994, [Retrieved on Feb. 20, 2014]. Retrieved from the internet: <URL: http://fisher.osu.edu/~muhanna.1/pdf/MetaModeling-MS94.pdf> 32 pages (1093-1123).*
Daniel Varro et al., Generic and Meta-Transformation for Model Transformation Engineering, Oct. 10-15, 2004, [Retrieved on Feb. 20, 2014]. Retrieved from the internet: <URL: http://static.inf.mit.bme.hu/pub/varro/2004/uml2004__vp.pdf> 15 Pages (1-15).*

* cited by examiner

*Primary Examiner* — Don Wong
*Assistant Examiner* — Anibal Rivera
(74) *Attorney, Agent, or Firm* — Buckley, Maschoff & Talwalkar LLC

(57) ABSTRACT

Some aspects relate to systems to determine a first metamodel conforming to a first meta-metamodel supporting metamodel class inheritance at the first metamodel level, identify one or more segments of an aggregation-free tree of nodes of the first metamodel, identify a lowest-level node of one of the one or more segments, identify all higher-level nodes of the one of the one or more segments, and consolidate attributes of each of the identified nodes of the one of the one or more segments into a node of a second metamodel conforming to a second meta-metamodel.

12 Claims, 5 Drawing Sheets

SYSTEMS AND METHODS FOR METAMODEL TRANSFORMATION

FIELD

Some embodiments relate to the use of object models within an application platform. More specifically, some embodiments relate to the transformation between model content expressed by metamodels not supporting specialization/inheritance and model content expressed by metamodels supporting specialization/inheritance.

BACKGROUND

According to conventional business software terminology, a business object is an object model representing real-world items used during the transaction of business. For example, a business object may represent a business document such as a sales order, a purchase order, or an invoice. A business object may also represent items such as a product, a business partner, or a piece of equipment. Particular documents (e.g., SalesOrder SO435539) and/or items (e.g., ACME corporation) are represented by instances of their representing business object, or business object instances.

A business process platform provides application programming interfaces to allow read and write access to business object instances. Notably, each specific business object (i.e., object model) conforms to a same metadata model (or, "metamodel"). As a result, a business process platform may employ similar application programming interfaces, services, and persistencies to support all instances of each specific business object.

A business process platform may include other metamodels describing technical entities such as, but not limited to, a Web Service, a view, a floorplan (i.e., a user interface layout), a work center, UI texts, and process components. Each metamodel, including the business object metamodel, may in turn conform to a same meta-metamodel. More specifically, each metamodel may comprise an instance of a same meta-metadata model.

Some application development tools (e.g., Eclipse-based tools) operate based on specific metamodels (e.g., Eclipse Modeling Framework (EMF) models). These metamodels are instances of a specific meta-metamodel (e.g., eCore). As such, these tools are unable to utilize metamodels (and their instances) which conform to a different meta-metamodel. Moreover, application platforms which support the different meta-metamodel are unable to use metamodels (and their instances) which conform to the above-mentioned specific meta-metamodel.

In some cases, the native meta-metamodel (e.g., eCore) of a development tool exposes the same modeling unit types as another meta-metamodel (e.g., UML). Accordingly, desired metamodels of the other meta-metamodel may be directly mapped to metamodels of the native meta-metamodel for use by the development tool. Commonly-assigned U.S. patent application Ser. No. 12/690,511 describes systems to map between metamodels of meta-metamodels which exhibit different modeling unit types.

However, neither of the foregoing mapping techniques supports mapping between metamodels of a first meta-metamodel which supports specialization/inheritance on the metamodel level and metamodels of a second meta-metamodel which does not support specialization/inheritance on the metamodel level.

DETAILED DESCRIPTION

Figure 1:
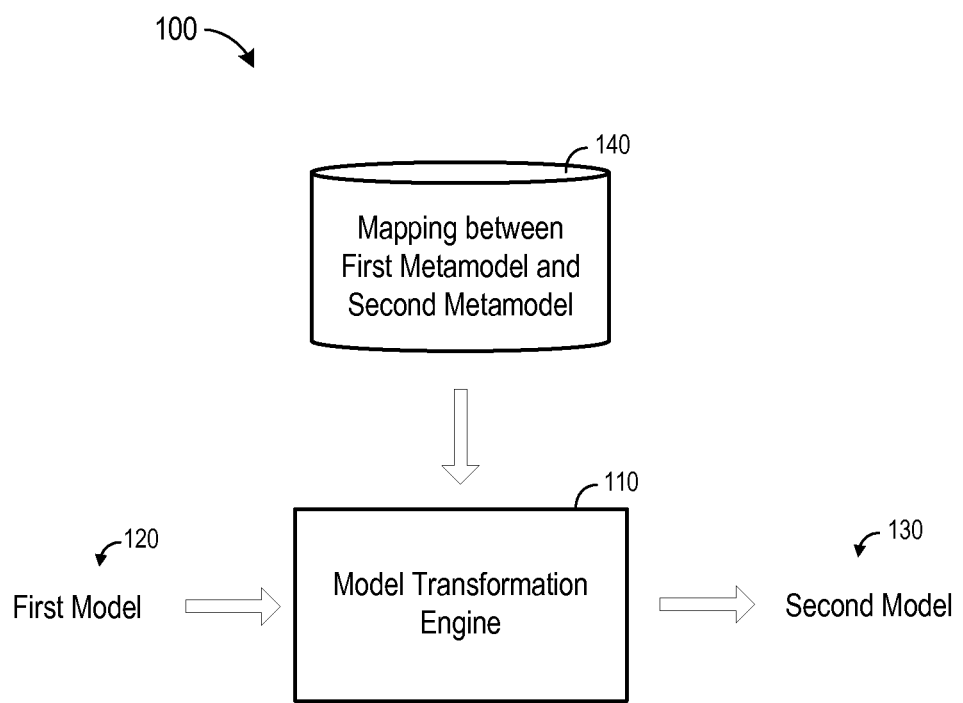
FIG. 1 is a block diagram of a system according to some embodiments.

FIG. 1 is a diagram of system 100 according to some embodiments. System 100 includes model transformation engine 110 for transforming first model 120 to second model 130. More specifically, model transformation engine 110 may receive first model 120 and may generate second model 130 based on a mapping stored in data store 140. The mapping comprises a mapping between a first metamodel of first model 120 and a second metamodel of second model 130.

First model 120 is an instance of the first metamodel and second model 130 is an instance of the second metamodel. Moreover, a first meta-metamodel of the first metamodel supports specialization/inheritance on the metamodel level and a second meta-metamodel of the second metamodel does not support specialization/inheritance on the metamodel level. For example, in some embodiments, the first meta-metamodel is the eCore meta-metamodel and the second meta-metamodel is the SAP APM3 meta-metamodel. For purposes of the present description, the term inheritance will be used to refer to the concepts of specialization and inheritance.

The elements of system 100 may be embodied using any combination of hardware and/or software that is or becomes known. For example, model transformation engine 110 may comprise a general-purpose computer processor executing program code stored on a tangible medium to provide the functions described herein. Moreover, data store 140 may comprise a database storing data and/or executable program code for facilitating the above-described transformation.

Figure 2:
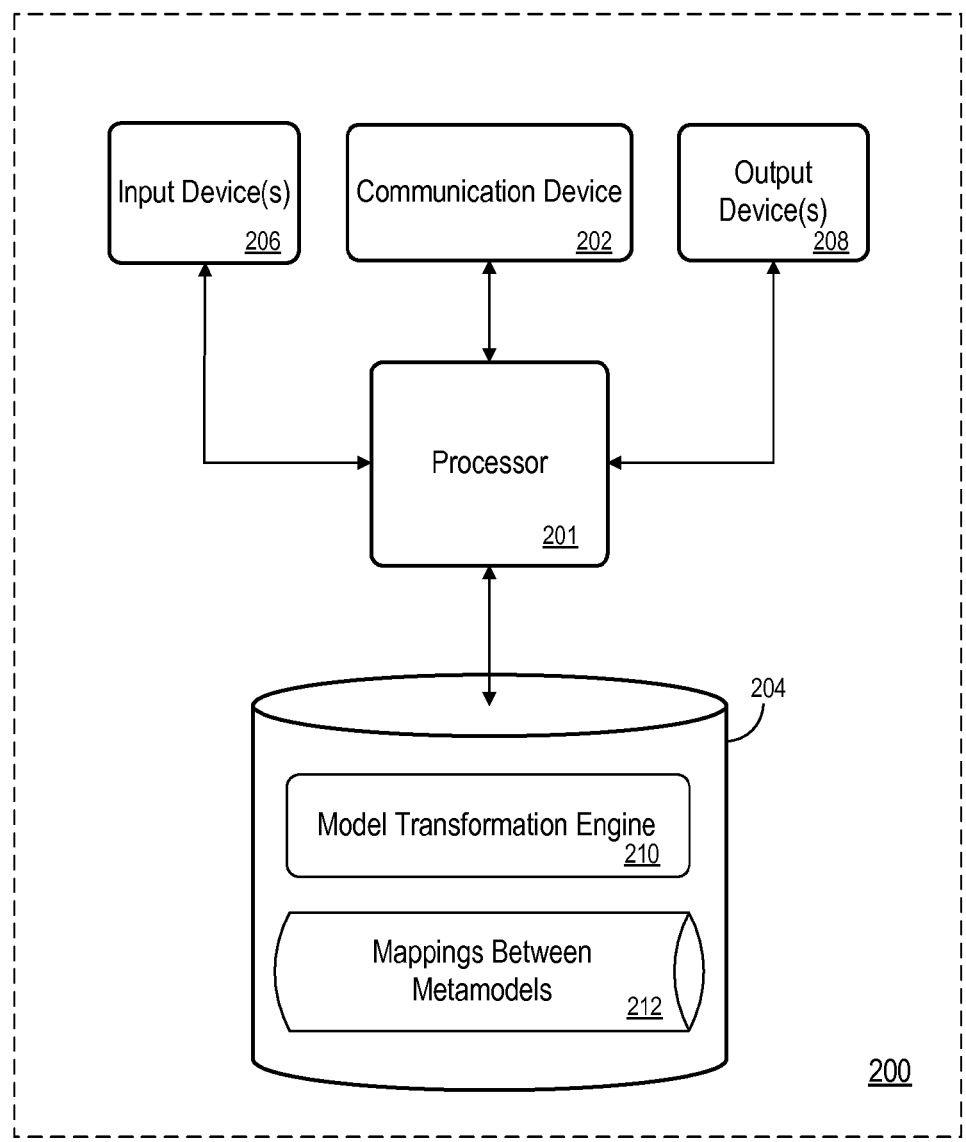
FIG. 2 is a block diagram of an apparatus according to some embodiments.

FIG. 2 is a block diagram of apparatus 200 according to some embodiments. Apparatus 200 may comprise a general-purpose computer system and may perform the functions attributed above to metamodel transformation engine 210. Apparatus 200 includes processor 201 operatively coupled to communication device 202, data storage device 204, one or more input devices 206 and one or more output devices 208. Communication device 202 may facilitate communication with external devices. Input device(s) 206 may comprise, for example, a keyboard, a keypad, a mouse or other pointing device, a microphone, knob or a switch, an infra-red (IR) port, a docking station, and/or a touch screen. Input device(s) 206 may be used, for example, to enter information into apparatus 200. Output device(s) 208 may comprise, for example, a display (e.g., a display screen) a speaker, and/or a printer.

Data storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Data storage device 204 stores program code for execution by processor 200. Model transformation engine 210 may comprise a set of such code, and may be executed by processor 201 to cause system 200 to operate as described above with respect to model transformation engine 110 of FIG. 1.

This operation may initially include operation of communication device 202 to receive a first metamodel from an external system.

Data storage device 204 also stores mappings between metamodels 312. Mappings 212 may include mappings between first and second metamodels as described above. Mappings 212 may comprise any combination of data and/or executable code.

Figure 3:
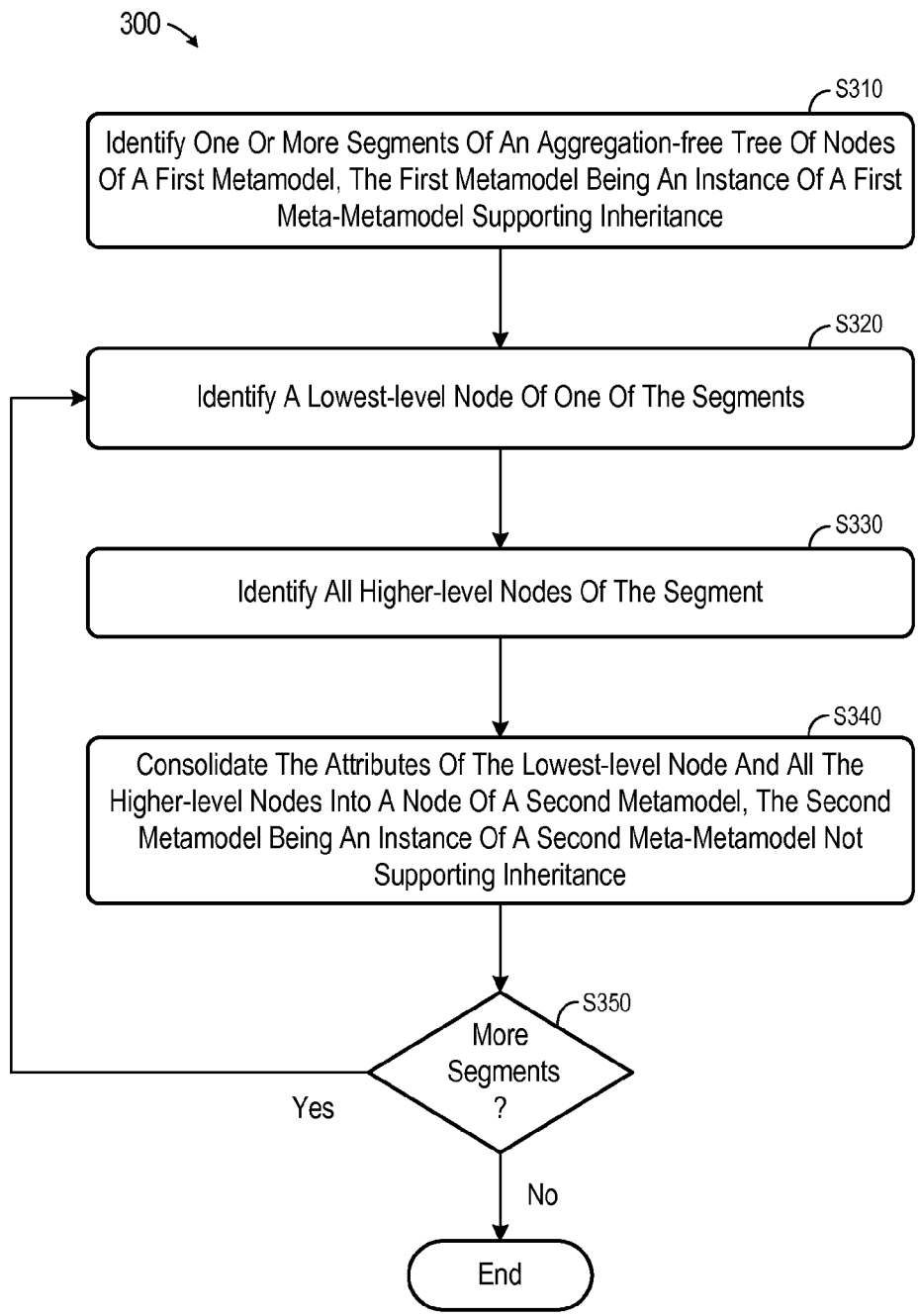
FIG. 3 is a flow diagram of a process according to some embodiments.

FIG. 3 is a flow diagram of process 300 according to some embodiments. Various elements of system 100 and/or apparatus 200 may execute process 300 according to some embodiments. Process 300 may be embodied within program code of metamodel transformation engine 210 of apparatus 200, but embodiments are not limited thereto.

Process 300 and all other processes mentioned herein may be embodied in processor-executable program code read from one or more non-transitory tangible computer-readable media, such as a fixed disk, a floppy disk, a CD-ROM, a DVD-ROM, a flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to S310, it is assumed that an instruction is received to transform a first model of a first metamodel to a second model of a second metamodel. As described in the Background, the first metamodel may represent a business object or a technical entity such as a Web Service, a view, a floorplan (i.e., a user interface layout), a work center, UI texts, and a process component. Process 300 may be initiated to facilitate usage of an instance of the first metamodel (e.g., a SalesOrder business object model) within an application development tool that conforms to a second meta-metamodel. Accordingly, process 300 provides transformation from the first metamodel to the second metamodel, based on which the instances thereof may be transformed.

Figure 4:
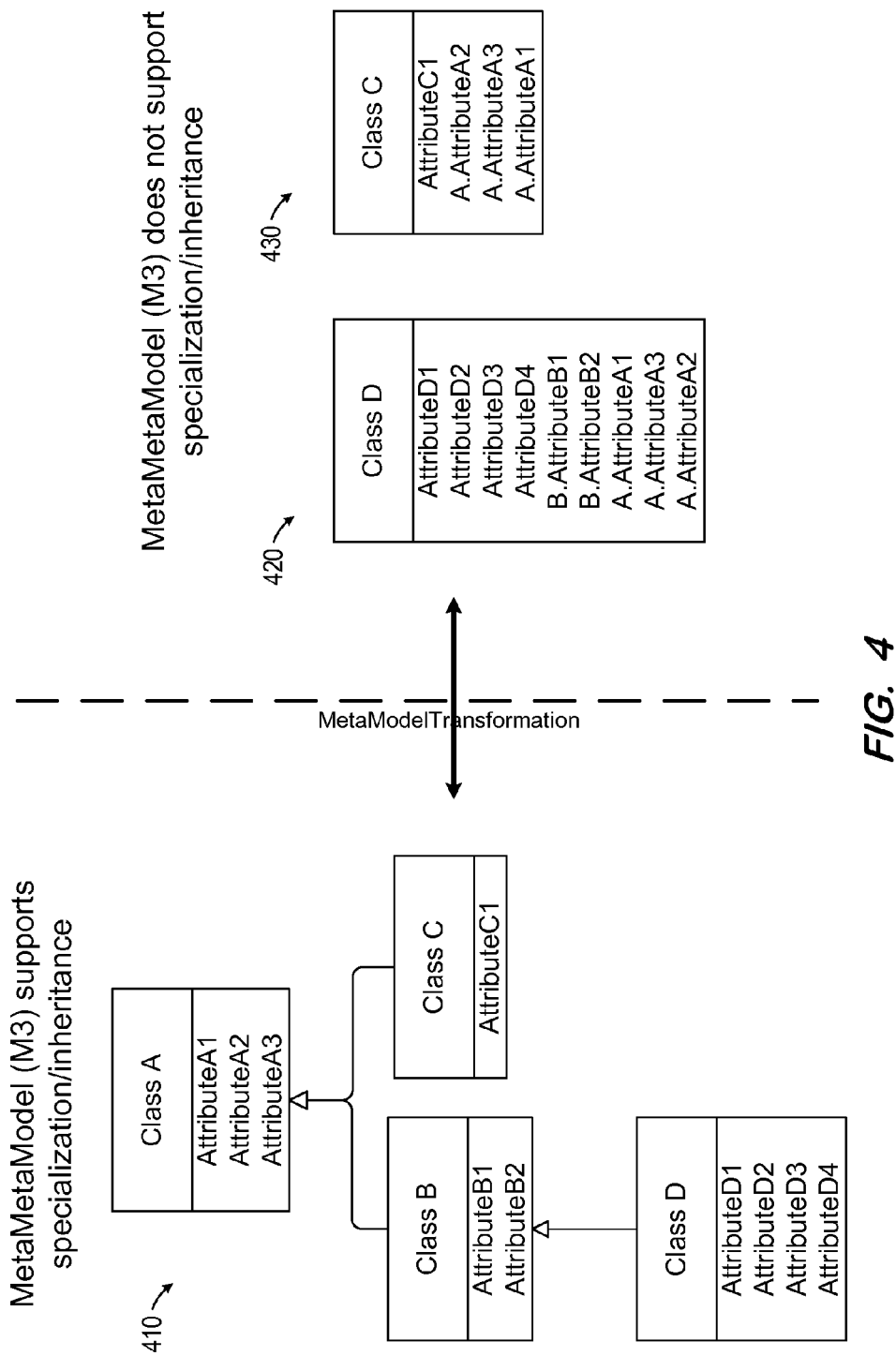
FIG. 4 illustrates a mapping between metamodels according to some embodiments.

Initially, at S310, one or more segments of an aggregation-free tree of nodes of the first metamodel are identified. The first metamodel is an instance of a first meta-metamodel supporting inheritance at the metamodel level. FIG. 4 illustrates process 300 according to some embodiments and will be referenced in the description thereof. Specifically, tree 410 includes nodes of the first metamodel distributed along two segments. Embodiments are not limited to the number of nodes or segments of tree 410.

A lowest-level node of one of the segments is identified at S320. For purposes of the present example, it will be assumed that Class D of tree 410 is identified at S320. Next, all higher-level nodes of the segment are identified at S330. Continuing with the example, the identified nodes are Class B and Class A.

Next, at S340, the attributes of the lowest-level node are consolidated with those of the identified high-level nodes into a node of a second metamodel. The second metamodel is an instance of a second meta-metamodel that does not support inheritance at the metamodel level.

FIG. 4 shows node 420 of a second metamodel created according to some embodiments of S340. Node 420 corresponds to Class D of tree 410. That is, Class D of tree 410 has been mapped to node 420. However, the attributes of Class A and Class B of tree 410, as well as the attributes of Class D of tree 410, have been consolidated into node 420. The attributes of Classes A and B of tree 410 are identified by prefixes "A." and "B.", respectively, in node 420.

At S350, it is determined whether the aggregation-free tree includes additional segments. The present example of tree 410 includes an additional segment so flow returns to S320, at which Class C is identified. Next, at S330, Class A (i.e., the sole "higher-level" node of the segment) is identified.

Again, at S340, the attributes of the lowest-level node are consolidated with those of the identified high-level nodes into a node of a second metamodel. FIG. 4 shows node 430 corresponding to Class C of tree 410. Node 430 includes the attributes of Class A and Class C of tree 410. According to the present example, flow terminates after S350 because no more segments of tree 410 remain.

Although process 300 describes transformation from the first metamodel to the second metamodel, embodiments also include transformation from the second metamodelt (i.e., not supporting inheritance) to the first metamodel (i.e., supporting inheritance). More particularly, the attributes of nodes 420 and 430 may be used to create tree 410 in some embodiments.

The first meta-metamodel and the second meta-metamodel may be associated with different modeling unit types as described in aforementioned U.S. patent application Ser. No. 12/690,511. The present description will assume that, if mappings between modeling unit types are required to transform the first metamodel to the second metamodel, such mappings occur in conjunction with process 300, as described in U.S. patent application Ser. No. 12/690,511 or otherwise. For example, when mapping a class with attributes of a first metamodel to a node with node elements of a second meta-model, node elements are created to correspond with attributes of the class as well as with attributes of any parent classes as described above.

Figure 5:
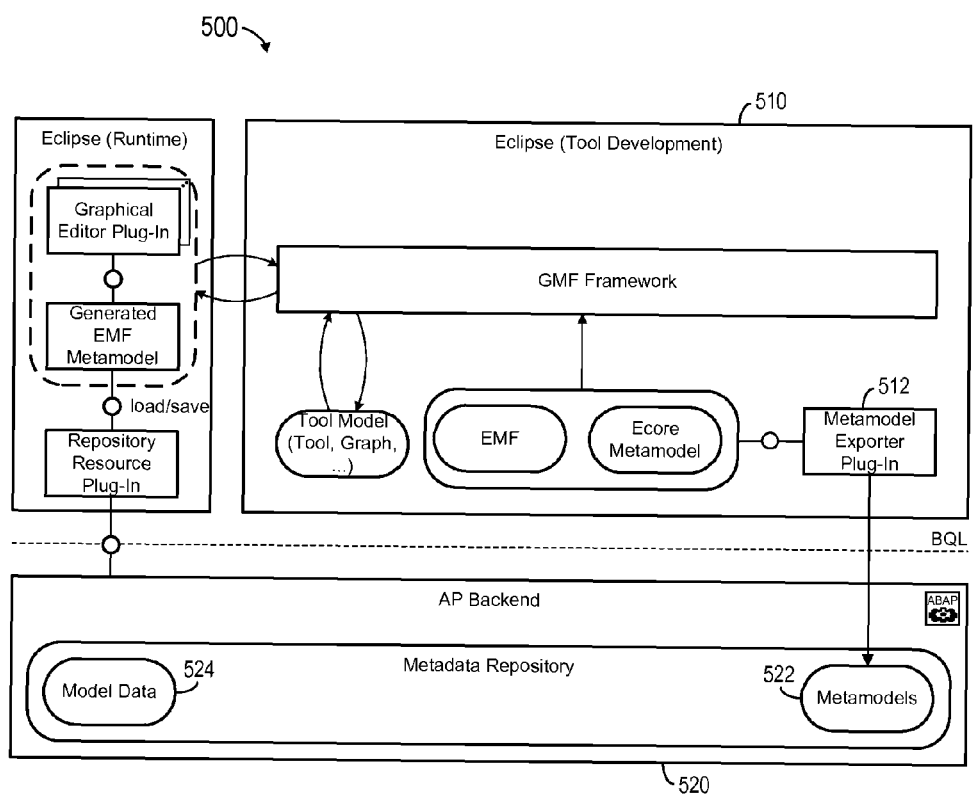
FIG. 5 is a block diagram of an architecture using metamodel transformation according to some embodiments.

FIG. 5 is a block diagram of system 500 according to some embodiments. System 500 may implement system 100, apparatus 200, and/or process 300 to transform a first metamodel of a first meta-metamodel to a second metamodel of a second meta-metamodel as described herein.

More specifically, tool development environment 510 is used to develop business tools/applications based on metamodels of a native meta-metamodel, which will be referred to as the first meta-metamodel, supporting inheritance at the metamodel level. Environment 510 may be used to provide metamodels to AP backend 520. However, metamodels 522 conform to a second meta-metamodel which does not support inheritance at the metamodel level. Accordingly, AP backend 520 is unable to use metamodels developed in tool development environment 510 in their native format.

Metamodel exporter plug-in 512 of environment 510 may therefore implement system 100, apparatus 200 and/or process 300 to transform a first metamodel of the native meta-metamodel to a second metamodel of the second meta-metamodel. According to some embodiments, the transformation results in a metamodel of metamodels 522 which can be used by AP backend 520 (e.g., to generate models for storage in model data 524).

The above-described block diagrams illustrate logical architectures for describing some embodiments, and actual implementations may include more or different components arranged in any manner. Each device and method described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, the method comprising:
    determining a first metamodel conforming to a first meta-metamodel supporting metamodel class inheritance at the first metamodel level;
    identifying one or more segments of an aggregation-free tree of nodes of the first metamodel;
    identifying a lowest-level node of one of the one or more segments;
    identifying all higher-level nodes of the one of the one or more segments; and
    consolidating attributes of each of the identified nodes of the one of the one or more segments into a node of a second metamodel conforming to a second meta-metamodel.

2. The method according to claim 1, wherein the second meta-metamodel does not support metamodel class inheritance at the second metamodel level.

3. The method according to claim 1, further comprising:
    identifying a second one or more segments of the aggregation-free tree of nodes of the first metamodel;
    identifying a second lowest-level node of one of the second one or more segments;
    identifying all higher-level nodes of the one of the second one or more segments; and
    consolidating attributes of each of the identified nodes of the one of the second one or more segments into a second node of the second metamodel.

4. The method according to claim 3, wherein the second meta-metamodel does not support metamodel class inheritance at the second metamodel level.

5. A system comprising:
    a memory storing processor-executable program code; and
    a processor to execute the processor-executable program code in order to cause the computing device to:
        determine a first metamodel conforming to a first meta-metamodel supporting metamodel class inheritance at the first metamodel level;
        identify one or more segments of an aggregation-free tree of nodes of the first metamodel;
        identify a lowest-level node of one of the one or more segments;
        identify all higher-level nodes of the one of the one or more segments; and
        consolidate attributes of each of the identified nodes of the one of the one or more segments into a node of a second metamodel conforming to a second meta-metamodel.

6. The system according to claim 5, wherein the second meta-metamodel does not support metamodel class inheritance at the second metamodel level.

7. The system according to claim 5, the processor to further execute the processor-executable program code in order to cause the computing device to:
    identify a second one or more segments of the aggregation-free tree of nodes of the first metamodel;
    identify a second lowest-level node of one of the second one or more segments;
    identify all higher-level nodes of the one of the second one or more segments; and
    consolidate attributes of each of the identified nodes of the one of the second one or more segments into a second node of the second metamodel.

8. The system according to claim 7, wherein the second meta-metamodel does not support metamodel class inheritance at the second metamodel level.

9. A non-transitory medium storing processor-executable program code, the program code executable by a processor to:
    determine a first metamodel conforming to a first meta-metamodel supporting metamodel class inheritance at the first metamodel level;
    identify one or more segments of an aggregation-free tree of nodes of the first metamodel;
    identify a lowest-level node of one of the one or more segments;
    identify all higher-level nodes of the one of the one or more segments; and
    consolidate attributes of each of the identified nodes of the one of the one or more segments into a node of a second metamodel conforming to a second meta-metamodel.

10. The medium according to claim 9, wherein the second meta-metamodel does not support metamodel class inheritance at the second metamodel level.

11. The medium according to claim 9, the program code further executable by a processor to:
    identify a second one or more segments of the aggregation-free tree of nodes of the first metamodel;
    identify a second lowest-level node of one of the second one or more segments;
    identify all higher-level nodes of the one of the second one or more segments; and
    consolidate attributes of each of the identified nodes of the one of the second one or more segments into a second node of the second metamodel.

12. The medium according to claim 11, wherein the second meta-metamodel does not support metamodel class inheritance at the second metamodel level.

* * * * *